Oct. 17, 1950

H. J. MERTZ 2,526,082

ROTARY FLUID COUPLING

Filed March 18, 1946

Inventor

HARRY J. MERTZ

By Carlsen + Hazle

Attorneys

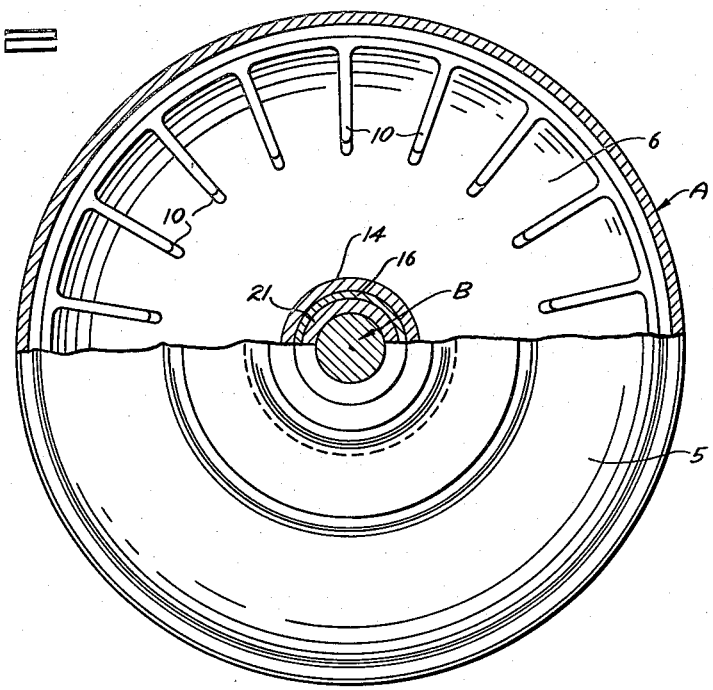
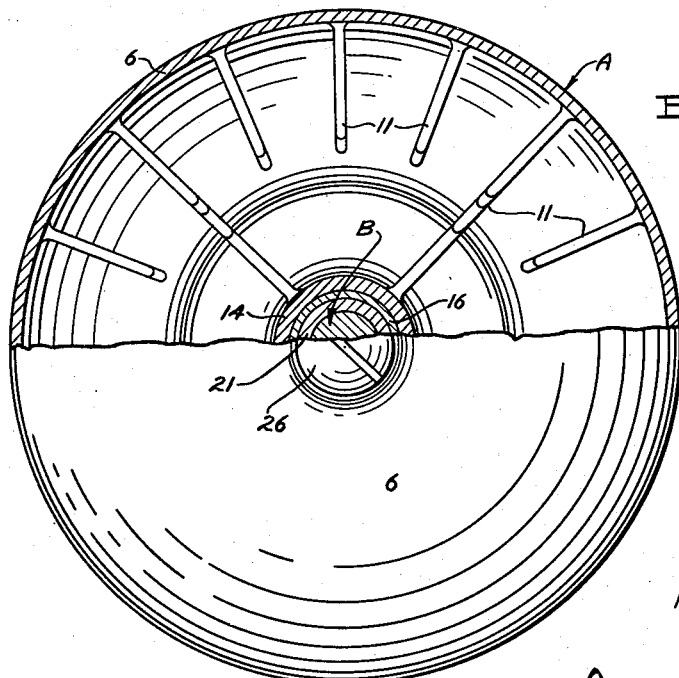

Patented Oct. 17, 1950

2,526,082

UNITED STATES PATENT OFFICE 2,526,082

ROTARY FLUID COUPLING

Harry J. Mertz, Webster City, Iowa, assignor to Solar Corporation, Milwaukee, Wis., a corporation of Delaware Application March 18, 1946, Serial No. 655,200

3 Claims. (Cl. 60—54)

This invention relates to fluid drive couplings or power transmitters of the turbine type, and the primary object of the invention is to provide a very simple, compact and inexpensive unit for transmitting power from a driving member to a driven member. Another object is to provide a coupling of this nature which has a total of only nine parts and which is so designed as to require a minimum of machining and assembly labor in its construction. Still another object is to provide a coupling in which the larger parts may be readily cast from any suitable material, such as an aluminum alloy which is not only light but dissipates heat rapidly allowing the unit to run cool at high speeds or under heavy loads. The use of castings for the major parts has further advantages such as the ease of assembly without gaskets and the convenience with which a drive pulley or similar means may be cast on either or both ends of the unit.

These and other more detailed and specific objects will be disclosed in the course of the following specification, reference being had to the accompanying drawings, in which—

Fig. 2 is a sectional and elevational view along the line 2—2 in Fig. 1.

Fig. 3 is a similar view along the line 3—3 in Fig. 1.

Figure 1:
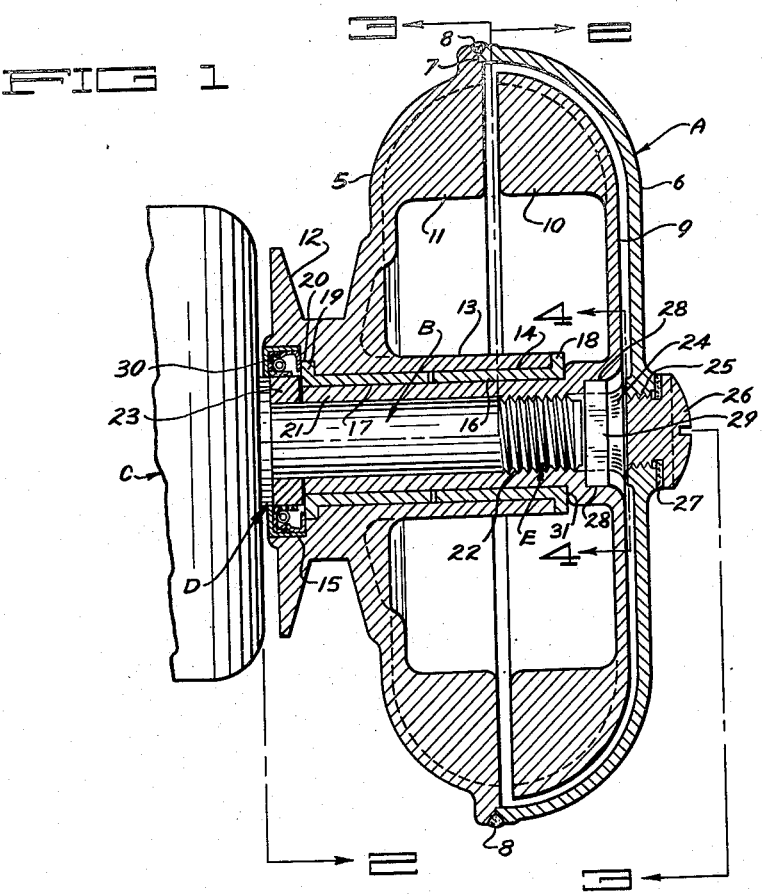
Fig. 1 is a diametrical sectional view through a coupling constructed in accordance with the invention, a part of a drive motor being shown in elevation.
Figure 4:
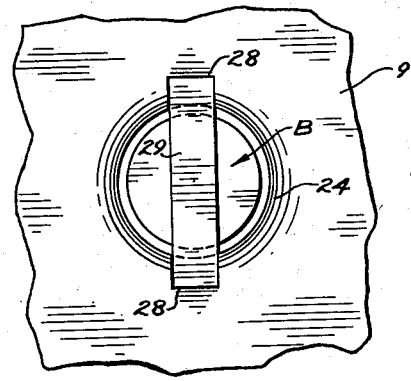
Fig. 4 is an enlarged fragmentary elevational view along the line 4—4 in Fig. 1.

Referring now more particularly and by reference characters to the drawing the fluid drive coupling is indicated generally at A and is here shown as arranged upon a drive shaft B which may extend from a motor C, or be otherwise supported and power driven. The shaft B has a reduced end portion terminating at a diametrically enlarged peripheral shoulder D adjacent the motor, and the extremity of the shaft is threaded at E. The threads E on the shaft are so cut that the rotation of the shaft will tend to tighten, rather than loosen, the part screwed thereon, such part being later described.

The fluid coupling per se comprises a housing made up of two half-sections or shells 5 and 6 which peripherally overlap at their meeting edges 7 where they may be welded or otherwise permanently connected as designated at 8, when the unit has been assembled. Once the unit is so assembled there will be little or no necessity for separating these shells and when they are thus welded together they are, of course, permanently sealed and no gasket is needed to contain the fluid in the coupling housing. Arranged within the housing thus formed is an impeller shell 9 having the usual radial impeller vanes 10 which cooperate with similar vanes 11 formed upon the housing shell 5 in the usual manner. It may here be noted that the shells 5, 6 and 9 are cast from any suitable material, preferably an aluminum alloy, so that the parts are readily and inexpensively made and so that heat is rapidly dissipated. Fins (not shown) may also be readily cast upon the outside of these cast shells 5 and 6 to assist in cooling, if the size and intended operating conditions for the unit require them.

As here shown a V-belt pulley 12 is cast integrally upon the end of the shell 5 and extending inwardly from this same end is an outer hub sleeve 13 which projects into the coupling coaxially about the shaft B. The bore 14 of this sleeve 13 extends clear out through the pulley 12 and is diametrically enlarged to form an annular recess 15 at the end of the pulley. The bore 14 is further considerably larger than the shaft B and positioned in the bore are two bushings 16 and 17 which are pressed into the sleeve B from opposite ends so that flanges or shoulders 18 and 19 on the bushings will come to rest, respectively, against the inner end of the sleeve and in a shallow recess 20 just inside the aforesaid recess 15. The bushings 16 and 17 have a running fit over and upon an inner hub sleeve or mounting sleeve 21 which extends from the impeller shell 9 and is positioned upon and around the shaft B. The sleeve 21 has internal threads 22 by which it may be screwed upon the threaded end E of the shaft and, when properly screwed thereinto, the end of the sleeve is turned up tightly against a spacer collar 23 positioned on the shaft against the shoulder D thereon. The collar 23 may, of course, be dispensed with if the shoulder D is properly machined or alternatively, the shaft need not itself be shouldered, and instead a stop may be provided against which the impeller may be screwed tight by affixing a shouldered sleeve to the shaft.

Adjacent the threaded portion 22 the impeller shell 9 is annularly recessed at 24 coaxially with the shaft B and said recess opens toward the end of the shell 6 in which is formed a tapped opening 25 by which access to the interior of the housing, and immediately into the recess 24, may be had. Normally a plug or screw 26 is screwed into the opening 25 to close the same and a tight seal is provided at this point by a gasket 27. At diametrically opposite points the circumferential wall of the recess 24 is notched as seen at 28 and fitted at its ends tightly into these notches is a key 29 which is thus positioned immediately inside and in registry with the opening 25. The key 29 may be staked into the notches 28 or secured in any other suitable manner therein.

Positioned in the recess 15 is an oil seal 30 which runs against the collar 23 and with the aforesaid gasket 27, forms the only sealing means required in the entire unit.

To assemble the coupling initially, the bushings or bearings 16 and 17 are pressed into the bore 14 of the outside hub sleeve 13 and, with the key 29 staked or fastened in the recess 24, the inside or mounting sleeve 21 is slipped into the bushings. The impeller 9 has a shoulder 31 (Fig. 1) which will now come to rest against the flange 18 of the bushing 16 while the extremity of the inside sleeve 21 will project very slightly beyond the opposite flange 19 of the bushing 17. Thus when the impeller is screwed tight on the shaft B against the spacer collar 23, the housing shell 5 will be free to turn with respect to the impeller and shaft.

After the parts are thus far assembled, the housing shell 6 is fitted over the impeller and welded or sweated at 8 peripherally to the shell 5 and the unit is then ready to install on the shaft. To install, the collar 23 and oil seal 30 are put in place and with the plug 26 removed the sleeve 21 is slipped on the shaft B until the threads meet and then a slotted end wrench (not shown) is inserted through the opening 25 and by engaging the wrench with the key 29 the threads 22 may be screwed on the shaft threads E until the end of the inside sleeve 21 is tightly firmly against the collar 23. The unit is thus fastened to the shaft B so that the impeller 9 must rotate therewith, while the housing formed by the shells 5 and 6 are free to turn with respect to the shaft. The proper amount of oil or other fluid may be put into the housing through the opening 25 and when the plug 26 is replaced the device is ready for use.

When the shaft B is now turned the impeller vanes 10 will pick up and carry along the fluid and will centrifugally actuate it to transmit drive to the vanes 11 on the housing setting the housing in motion. Power may then be taken off by a belt on the pulley 12. It will be evident that a pulley groove may be formed on either or both shells 5 and 6 according to requirements.

To remove the unit from the shaft the plug 26 is removed and a wrench inserted and engaged with the key 29 so that the impeller sleeve 21 may be unscrewed, as will be readily apparent.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A fluid drive device, comprising an impeller having a sleeve portion adapted to be threaded onto a threaded power shaft, a fluid housing rotatable about the sleeve and enclosing the impeller, said impeller and housing having cooperating fluid power transmitting elements, the housing having a normally closed opening coaxial with the power shaft, and means on the impeller for engagement by a tool inserted through the opening whereby the impeller sleeve may be threaded onto or turned off the power shaft.

2. A fluid drive coupling, comprising an impeller having fluid actuating vanes and a sleeve for screwing onto a threaded power shaft, a fluid retaining housing enclosing the impeller and rotatably mounted upon and carried by the sleeve, cooperating fluid actuatable vanes in the housing, the said housing having a normally closed hole coaxial with the sleeve and shaft, and a key member carried by the impeller and adapted to be engaged by a tool introduced through the hole when it is opened whereby the impeller may be turned to screw the sleeve onto the shaft or unscrew it therefrom.

3. A fluid drive coupling, comprising an impeller having fluid actuating vanes and a sleeve for screwing onto a threaded power shaft, a fluid retaining housing enclosing the impeller and rotatably mounted upon and carried by the sleeve, cooperating fluid actuatable vanes in the housing, the said housing having a normally closed hole coaxial with the sleeve and shaft, the impeller having a recess located in registry with the hole in the housing and the said recess having diametrically opposed notches, and a key secured at its ends in said notches for engagement by a slotted member inserted through the hole when it is opened to turn the sleeve onto or off the shaft.

HARRY J. MERTZ.

REFERENCES CITED

The following references are of record in the file of this patent:

UNITED STATES PATENTS

| Number | Name | Date |
|---|---|---|
| 2,094,095 | Collins | Sept. 28, 1937 |
| 2,150,539 | Carson et al. | Mar. 14, 1939 |
| 2,295,887 | Bixby et al. | Sept. 15, 1942 |
| 2,378,353 | Zeidler | June 12, 1945 |
| 2,389,841 | Conant | Nov. 27, 1945 |
| 2,397,862 | Jencick | Apr. 2, 1946 |
| 2,397,869 | Kirby | Apr. 2, 1946 |
| 2,420,071 | Fields | May 6, 1947 |